United States Patent
Baluta et al.

(10) Patent No.: US 8,666,785 B2
(45) Date of Patent: Mar. 4, 2014

(54) METHOD AND SYSTEM FOR SEMANTICALLY CODING DATA PROVIDING AUTHORITATIVE TERMINOLOGY WITH SEMANTIC DOCUMENT MAP

(75) Inventors: Wasyl Baluta, Calgary (CA); Shafquat Mahmud, Calgary (CA)

(73) Assignee: Wairever Inc., Calgary (CA)

( * ) Notice: Subject to any disclaimer, the term of this patent is extended or adjusted under 35 U.S.C. 154(b) by 0 days.

(21) Appl. No.: 13/193,280

(22) Filed: Jul. 28, 2011

(65) Prior Publication Data

US 2012/0029951 A1     Feb. 2, 2012

Related U.S. Application Data

(60) Provisional application No. 61/368,526, filed on Jul. 28, 2010.

(51) Int. Cl.
*G06Q 40/00*     (2012.01)
*G06Q 40/02*     (2012.01)

(52) U.S. Cl.
CPC ..................................... *G06Q 40/02* (2013.01)
USPC .................. 705/4; 707/790; 707/6; 707/776; 707/758; 711/118; 704/9; 704/3; 706/62; 706/55; 715/700; 709/248; 705/2

(58) Field of Classification Search
USPC ...................... 705/4, 2; 707/790, 6, 776, 758; 711/118; 704/4, 9, 3; 706/62, 55; 715/700, 781; 709/248
See application file for complete search history.

(56) References Cited

U.S. PATENT DOCUMENTS

| | | | |
|---|---|---|---|
| 5,740,800 | A | 4/1998 | Hendrickson et al. |
| 6,983,423 | B2 | 1/2006 | Dvorak et al. |
| 7,230,529 | B2 | 6/2007 | Ketcherside, Jr. et al. |
| 7,263,517 | B2 * | 8/2007 | Sheu et al. ............................ 1/1 |
| 7,359,922 | B2 | 4/2008 | Young-Lai et al. |
| 7,376,551 | B2 * | 5/2008 | Powell et al. ..................... 704/4 |
| 7,689,555 | B2 * | 3/2010 | Dettinger et al. ...... 707/999.005 |
| 7,809,551 | B2 * | 10/2010 | Sandor et al. ..................... 704/9 |
| 7,822,626 | B2 | 10/2010 | Harp et al. |
| 7,953,755 | B2 * | 5/2011 | Keith et al. ................... 707/790 |
| 8,099,401 | B1 * | 1/2012 | Hsu et al. ...................... 707/705 |
| 2002/0147578 | A1 * | 10/2002 | O'Neil et al. ..................... 704/9 |
| 2003/0074220 | A1 | 4/2003 | Brandt |
| 2004/0078231 | A1 | 4/2004 | Wilkes et al. |
| 2004/0122661 | A1 | 6/2004 | Hawkinson et al. |
| 2005/0060191 | A1 | 3/2005 | Parkins et al. |
| 2006/0184523 | A1 * | 8/2006 | Israel et al. ....................... 707/6 |
| 2007/0005154 | A1 | 1/2007 | Lancaster et al. |

(Continued)

OTHER PUBLICATIONS

U.S. Appl. No. 61/042,582, filed Apr. 4, 2008, Wasyl Baluta, titled "System and Method for Validating and Optimizing Clinical Orders," in its entirety.

*Primary Examiner* — Tien Nguyen
(74) *Attorney, Agent, or Firm* — Ulmer & Berne LLP

(57) ABSTRACT

A method and system is provided for validating claim submissions against a claim policy that can perform a comparative analysis by comparing structured or unstructured claim submissions to semantically structured policies to direct and optimize processing of the claim submission. A method and system is also provided for enabling semantic interoperability across different proprietary electronic transaction records. Semantic queries and semantic analysis can be performed on a collection of electronic transaction records originating from different proprietary systems.

12 Claims, 4 Drawing Sheets

(56) References Cited

U.S. PATENT DOCUMENTS

| | | |
|---|---|---|
| 2007/0005394 A1 | 1/2007 | Bleyendaal et al. |
| 2007/0174041 A1* | 7/2007 | Yeske ............................ 704/3 |
| 2007/0198293 A1 | 8/2007 | Ash et al. |
| 2007/0198294 A1 | 8/2007 | Ash et al. |
| 2007/0203746 A1 | 8/2007 | DeHaan et al. |
| 2007/0294200 A1* | 12/2007 | Au .................................. 706/55 |
| 2008/0177579 A1 | 7/2008 | DeHaan |
| 2009/0006654 A1* | 1/2009 | Auriemma et al. ........... 709/248 |
| 2009/0254509 A1 | 10/2009 | Baluta |
| 2010/0070517 A1* | 3/2010 | Ghosh et al. .................. 707/758 |
| 2010/0174675 A1* | 7/2010 | Mons et al. .................... 707/603 |
| 2011/0022798 A1* | 1/2011 | Hou et al. ...................... 711/118 |

\* cited by examiner

METHOD AND SYSTEM FOR SEMANTICALLY CODING DATA PROVIDING AUTHORITATIVE TERMINOLOGY WITH SEMANTIC DOCUMENT MAP

CROSS-REFERENCE TO RELATED APPLICATIONS:

This application claims priority of U.S. provisional patent application Ser. No. 61/368,526 filed Jul. 28, 2010, and hereby incorporates the same provisional application by reference herein in its entirety.

TECHNICAL FIELD

The present disclosure is related to the field of artificial intelligence based systems and methods for validating claim submissions involving clinical, financial, insurance or legal content and, in particular, the field of artificial intelligence based systems and methods for achieving semantic interoperability over different electronic records or transactions involving clinical, financial, insurance or legal content.

BACKGROUND

In processing claim submissions (ie, "Claim" or "Claims"), including but not limited to clinical, financial, insurance or legal claims, the Claims can be, typically, a mix of unstructured and un-coded natural text. The Claims must be manually interpreted and compared to guidelines, policies, or profiles that describe criteria for subsequent downstream processing. A Claim can typically be accepted, declined, or redirected as appropriate for the business function.

As an example, when processing clinical disability Claims, Claims can be submitted via typical electronic sources including web applications, email, or fax. The Claim must then be evaluated according to evaluation guidelines. The guidelines are documents written to reflect policy, and are typically unstructured and un-coded natural text. Claims evaluators, people that manage the evaluation of Claims, use the guidelines to inform processing decisions such as accepting the Claim, declining the Claim, deferring for further analysis, or processing according to alternative means.

With unstructured and un-coded policies, the Claims evaluator must individually learn, translate, interpret and decide how to process each Claim leaving the Claim processing to a very manually intensive function. As such, the processing of Claims against unstructured and un-coded textual guidelines or policies is tedious, error prone, time consuming and expensive. As part of the Claim, the claimer's patient records can be retrieved from various healthcare institutions as evidence to the Claim.

A fundamental technical challenge facing the health care industry is that patient records are not interoperable across different sites of care. A key cause of this problem is that different sites use different data structures, data terminologies, and semantic interpretation. Unifying terminologies across various systems to an authoritative terminology is a key step in addressing this problem.

It is, therefore, desirable to provide methods and systems that overcome the shortcomings of the prior art, and to automate Claims processing against Claims guidelines or policies as an alternative to manual processing, and to enable properly contextualized semantic interoperability of patient data across data systems.

SUMMARY

Claim submissions can enter the submission validation process as unstructured and un-coded text. By utilizing natural language processing techniques with potentially manual verification, it is possible to create structured and coded Claims, as well as structured and coded Claims validation policies. Such techniques are disclosed in U.S. Patent Applications Ser. No. 61/042,582 filed Apr. 4, 2008 and Ser. No. 12/417,094 filed on Apr. 2, 2009, both of which applications are hereby incorporated by reference into this application in their entirety. Presented herein is a method and system of automating submission validation and processing using structured and semantically coded policies, semantically enabled comparative analytics, rules engines, and managed semantic terminologies.

In some embodiments, the application of structuring and coding submissions can be extended to a validation policy. One or more validation policies can be compared to the submissions to determine correct course of action. A policy manager can use a terminology matcher to process the policy and suggest semantic codes for each concept. Concepts can be captured in pre-determined sections to provide context and improve natural language processing accuracy.

In some embodiments, the policy manager can enable the construction of semantically structured policies with rules for processing.

In some embodiments, the semantic codes can be expanded to create a semantic structure representing a conceptual semantic policy. A comparative analyzer can compare the semantic policy to a structured and coded submission to produce a semantic relevance score. In other embodiments, the semantic policy can be compared to unstructured and un-coded submissions using natural language processing techniques over the term set of the semantic policies, concepts, phrases, terms and synonyms. In further embodiments, the relevance scores can be weighted by contextualized sections present in both submission and in the semantic policy.

In some embodiments, the comparison of the submission can be done to many policies to identify the most relevant policy.

In some embodiments, the contextualized comparative results of a submission to a policy can be analyzed by a rule machine to direct the processing of the submission to one or more appropriate downstream workflow tasks, whether carried out manually or in an automated fashion.

In some embodiments, the policies and the processing directives captured in the policy rules can be compared to each other to identify optimization opportunities for the organization and structure of policies as well as the workflow. The policies can then be updated to incorporate the optimizations using the policy manager.

In some embodiments, the submissions can be associated with the policy to enable learning and adaptation. The comparative analyzer can then expand the semantic structure of the policy to incorporate new concepts, phrases, or terms that are part of the submission that have not been incorporated in the policy originally.

In some embodiments, the method and system can support structured policies with rule support in policies and in Claim submission processing decisions. In some embodiments, the method and system can further support "learning" of the terminology used in Claims by expanding terminology, classification of inputs and refined heuristics for improving accuracy and speed in the codification of Claim submissions. In some embodiments, the method and system can support the transition from traditional Claim submission processes to electronic and on-line Claim submissions.

In some embodiments, a method and system is provided for enabling semantic interoperability across different proprietary electronic records. In some embodiments, the method can comprise receiving the proprietary document of one or more electronic data record systems (or data systems) and reviewing a list or database of the proprietary terms used in any given electronic data system, which can be stored in a proprietary "Data Terminology" list for that electronic data system. Each electronic data system can comprise its own unique proprietary Data Terminology that may or may not directly correspond to the same or similar terms in other electronic data systems. The Data Terminology can be derived from the order catalogue, problem list, assessment questions and respective answers, of a hospital, health-care facility, clinic, public or private health-care administration organization, or health-care provider. Documents produced or contained in any given electronic data system will comprise one or more proprietary terms used in the Data Terminology of that data system. The Documents can form a specific and finite context for practice, which can be a direct implementation of practice policy, practice standards, practice guidelines, business rules, or other business requirements that are related and managed individually or as a set. For the purposes of this application, "order set", "order set templates", "order forms", "structured documentation templates", "structured rules", "care maps", "care pathways", "patient flow models", "clinical practice guidelines", "workflow", "scenarios", "profile", "standardized screen designs", or any elements of electronic system screens or functional behavior that are configured to implement standardized practice or policy within a context, are synonymous with Documents. These documents can be coded against, or compared to, an authoritative semantic terminology that can amend the proprietary terms used in a given electronic data system by adding or associating corresponding codes drawn from the universal terms to the proprietary terms, and that can, in further embodiments, further take into account the context in which the proprietary terms are being used. In so doing, documents from various electronic data systems can be amended to code the proprietary terms used in a given system with a universal set of terms that can have the same meaning and context. In other words, proprietary terms in documents from different electronic data systems can be coded in accordance with universally accepted or determined terms wherein comparing documents from different electronic data systems go from being an "apples and oranges" comparison to an "apples and apples" comparison. For the purposes of this application, the terms "inventory of items", "authoritative catalogue of a health authority", "order inventory", "canonical registry", "orderable catalogue", "standardized order inventory", "predefined standardized inventory", "standard nomenclature" and "data dictionary" are synonymous with Data Terminology.

In some embodiments, the method can further use the process to contextually code or map proprietary terms in documents from an electronic data system to an authoritative or universal semantic terminology to then contextually code or map the proprietary terms in the electronic records of any given electronic data system with the authoritative or universal terminology. In further embodiments, the contextually coded or mapped electronic records can then be stored and indexed in a repository wherein the records can be semantically queried or analyzed.

In some embodiments, the system for enabling semantic interoperability across different proprietary electronic records can comprise computing means and database software means, as obvious and well known to those skilled in the art, to implement and carry out the steps of the method disclosed herein.

In some embodiments, a method and system is provided that can comprise a "semantic interoperable index" to provide a lookup table of coded electronic records or documents, ordered by the universal codes associated with the records or documents, or by other attributes of the records or documents, including temporal attributes.

For the purposes of this disclosure and the figures contained herein, the terms (both in singular and plural format) "data term", "term", "proprietary term", "order", "clinical order", "order item", "canonical item", "orderable item", "approved order" and "supported order" all mean the same thing, namely, an entry in a proprietary Data Terminology of an electronic data system. The terms "code", "coded" or "coding" mean that something has been "tagged" or "mapped", or being "tagged" or "mapped", to one entry, or possibly multiple entries in the "authoritative semantic terminology". The word "code" is chosen because, in practice, the unique numeric identification ("ID") "code" of the entry(s) can be recorded from the "authoritative semantic terminology" when tagging a document or record. The term "document" means the pre-defined or structured content (for screen display, reference or functional behavior) from a proprietary electronic data system, wherein the documents comprise proprietary data elements and wherein the documents provide the context for the coding of the proprietary data elements.

U.S. patent application Ser. No. 12/417,094 filed Apr. 2, 2009 discloses systems and methods for developing, implementing and managing orders and order inventories and, in particular, designing and validating clinical orders and order inventories including medications/pharmaceuticals, clinical interventions such as laboratory tests and procedures, diagnostic imaging test and procedures and treatment protocols, which is incorporated into this application in its entirety.

Broadly stated, in some embodiments, a method is provided for validating a claim submission against a policy, the method comprising the steps of: receiving a claim submission further comprising terms; receiving a claim policy and structuring a coded claim policy from the claim policy; comparing the terms of the claim submission with the coded claim policy; and determining if the claim submission complies with the coded claim policy and, if so, producing a validated claim submission.

Broadly stated, in some embodiments, a method is provided for validating a claim submission against a policy, the method comprising the steps of: receiving a claim submission further comprising terms; if the claim submission is unstructured and un-coded, structuring and coding the claim submission; matching the terms of a structured and coded claim submission against a set of known or defined terms to produce at least one validated term, if any terms of the structured and coded claim submission can be matched; receiving a claim policy and structuring a coded claim policy from the claim policy; comparing the validated terms of the structured and coded claim submission with the coded claim policy; and determining if the structured and coded claim submission complies with the coded claim policy and, if so, producing a validated claim submission.

Broadly stated, in some embodiments, a system is provided for validating a claim submission against a policy, the system comprising: means for receiving a claim submission further comprising terms; means for receiving a claim policy and structuring a coded claim policy from the claim policy; means for comparing the terms of the claim submission with the coded claim policy; and means for determining if the claim submission complies with the coded claim policy and, if so, for producing a validated claim submission.

Broadly stated, in some embodiments, a system is provided for validating a claim submission against a policy, the system comprising: means for receiving a claim submission further comprising terms; means for structuring and coding an unstructured and un-coded claim submission; means for matching the terms of a structured and coded claim submission against a set of known or defined terms to produce at least one validated term; means for receiving a claim policy and structuring a coded claim policy from the claim policy; means for comparing the validated terms of the structured and coded claim submission with the coded claim policy; and means for determining if the structured and coded claim submission complies with the coded claim policy and, if so, for producing a validated claim submission.

Broadly stated, in some embodiments, a system is provided for semantically coding at least one proprietary document belonging to at least one proprietary data system, comprising: at least one proprietary data terminology list associated with at least one proprietary data system, wherein each proprietary data terminology list comprises at least one proprietary data term; a proprietary document repository associated with the at least one proprietary data system, the proprietary document repository comprising at least one proprietary document associated with the at least one proprietary data system, each proprietary document further comprising at least one proprietary data element; at least one proprietary transaction record associated with the at least one proprietary data system, each proprietary transaction record comprising a timestamp and a reference to the at least one proprietary data element; and one or more semantic data system, wherein each semantic data system further comprises: an authoritative or universal semantic terminology comprising at least one semantic term, means for receiving the proprietary data terminology associated with the at least one proprietary data system, means for receiving the at least one proprietary document associated with the at least one proprietary data system, and at least one semantic document map comprising at least one semantic data element wherein each semantic data element comprises the reference to the at least one proprietary data element and at least one of the at least one semantic terms.

Broadly stated, in some embodiments, a method is provided for semantically coding at least one proprietary document belonging to at least one proprietary data system, the method comprising the steps of: providing at least one proprietary data terminology list associated with at least one proprietary data system, wherein each proprietary data terminology list comprises at least one proprietary data term; providing a proprietary document repository associated with the at least one proprietary data system, the proprietary document repository comprising at least one proprietary document associated with the at least one proprietary data system, each proprietary document further comprising at least one proprietary data element; providing at least one proprietary transaction record associated with the at least one proprietary data system, each proprietary transaction record comprising a timestamp and a reference to the at least one proprietary data element; and providing one or more semantic data system, wherein each semantic data system further comprises: an authoritative or universal semantic terminology comprising at least one semantic term, means for receiving the proprietary data terminology associated with the at least one proprietary data system, means for receiving the at least one proprietary document associated with the at least one proprietary data system, and at least one semantic document map comprising at least one semantic data element wherein each semantic data element comprises the reference to the at least one proprietary data element and at least one of the at least one semantic terms.

Broadly stated, in some embodiments, a method is provided for semantically coding at least one proprietary transaction data record belonging to at least one proprietary data system, the method comprising the steps of: receiving the at least one proprietary transaction data record from the at least one proprietary data system; deriving at least one proprietary data element and at least one proprietary document associated with the at least one proprietary transaction data record; looking up a semantic map corresponding to the at least one proprietary data element and to the at least one proprietary document, and determining at least one semantic term; and associating the at least one proprietary transaction data record with the at least one semantic term to create a semantic transaction record, comprising of a reference to the at least one proprietary transaction data record, and the at least one semantic term.

Broadly stated, in some embodiments, a system is provided for semantically coding at least one proprietary transaction data record belonging to at least one proprietary data system, comprising: means for receiving the at least one proprietary transaction data record from the at least one proprietary data system; means for deriving at least one proprietary data element and at least one proprietary document associated with the at least one proprietary transaction data record; means for looking up a semantic map corresponding to the at least one proprietary data element and to the at least one proprietary document, and determining at least one semantic term; and means for associating the at least one proprietary transaction data record with the at least one semantic term to create. a semantic transaction record, comprising of a reference to the at least one proprietary transaction data record, and the at least one semantic term.

Figure 1:
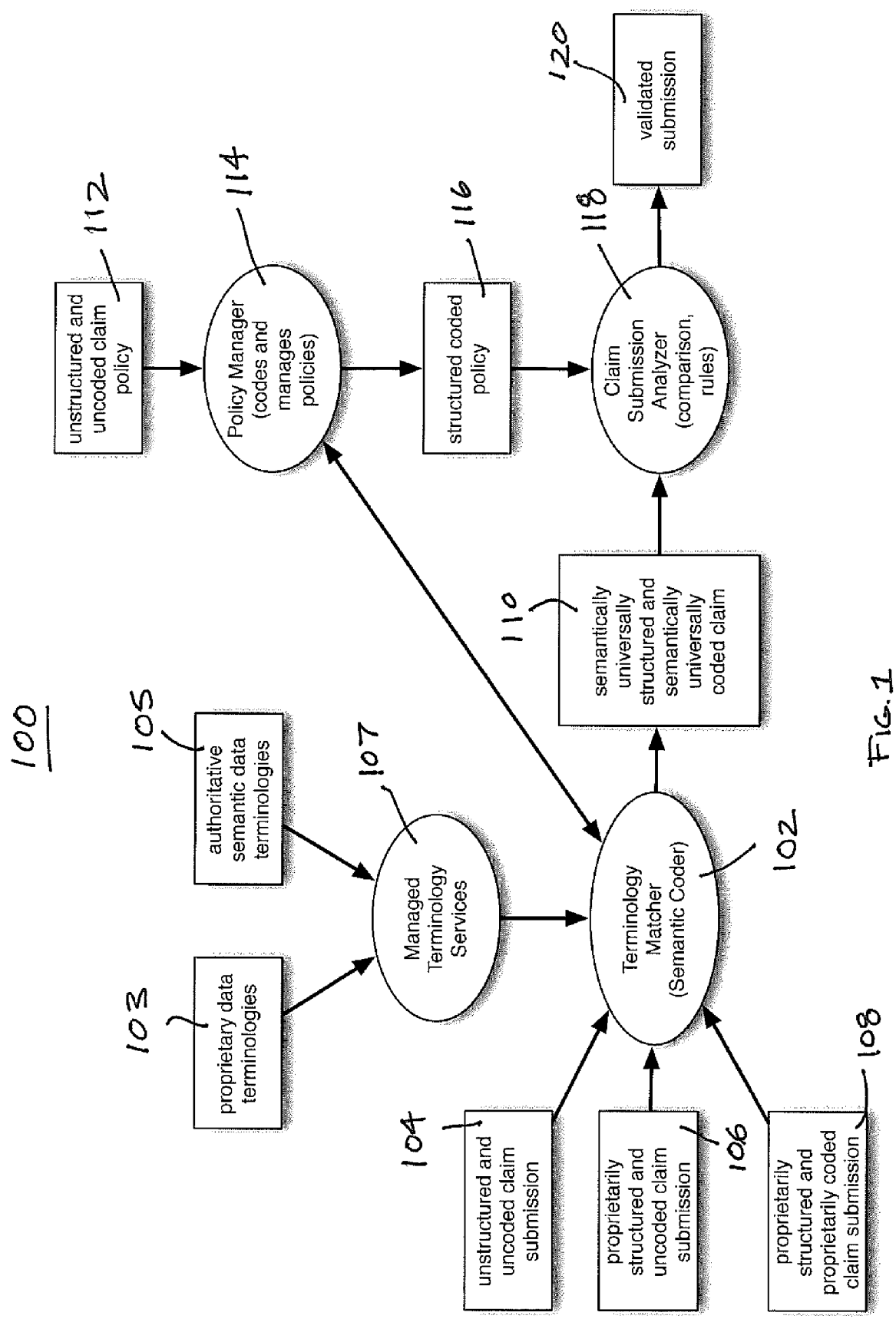
FIG. 1 is a block diagram depicting a system for the processing and validation of a claim submission against a claim policy.

DETAILED DESCRIPTION OF EMBODIMENTS:

Referring to FIG. 1, claim validation system 100 is illustrated. In some embodiments, claim submissions can be received by terminology matcher 102 as un-coded and/or unstructured submissions 104. Terminology matcher 102 can also receive proprietarily structured and uncoded claim submissions 106, in addition to proprietarily structured and proprietarily coded claim submissions 108. Terminology matcher 102 can also receive proprietarily structured and proprietarily coded claim submissions such as e-filed. submissions with parts that are either structured or unstructured, coded or uncoded. Once received, the submissions can be analyzed by terminology matcher 102 to detect terms contained therein. The detected terms can then be compared with a set of known or defined terms so as to produce a match validation, that is, validating the known terms contained within the Claim submission to produce semantically and universally structured and coded claim 110. The structured and coded Claim policy 116, through the Policy Manager 114, can be used to inform the terminology matcher and analyzer processing.

In some embodiments, unstructured and un-coded Claim policies 112 can be evaluated by policy manager 114, using the Terminology Matcher 102, to produce semantically structured and coded policies 116. The validated terms of coded claim 110 can then be compared against structured and coded policy 116.

In some embodiments, if the validated terms of coded claim 110 substantially comply with structured and coded policy 116, validated claim submission 120 can be produced. In other words, the Claim submission can otherwise be processed or approved. If the validated terms of coded claim 110 do not substantially comply with structured and coded policy 116, then validated submission 120 may not be produced, and the Claim submission may not otherwise be processed or approved.

In some embodiments, system 100 can comprise terminology manager 107, which can further comprise proprietary data terminology lists 103 and/or authoritative semantic data terminology lists 105 to provide the means for semantically coding policies or documents used by terminology matcher 102 to transform claim submissions 104, 106 or 108 to coded claim submissions 110. In some embodiments, system 100 can comprise at least one general-purpose computer or server configured to comprise and operate computer software that can perform the methods described herein. In some embodiments, the terminology manager can further comprise at least one database of terms disposed on one or more general-purpose computers, and computer software configured to manage and manipulate the database of terms. In some embodiments, the computer software can comprise the Plexina™ software system as manufactured by Wairever Inc. of Calgary, Alberta, Canada, and as more fully described and disclosed in U.S. patent application Ser. No. 12/417,094 filed Apr. 2, 2009. In other embodiments, the methods and systems described herein can also comprise, or be carded out on, computer software being operated on one or more general-purpose computers that can communicate with one or more of each other over a telecommunications network. In further embodiments, the telecommunications network can further comprise the internet.

In some embodiments, the methods and systems described herein can be used for claim submissions and the claim policies for the assimilation of the claim submissions, wherein a claim submission can comprise a combination of a completed form in accordance with a claim template and electronic health records to substantiate the claim submission, and wherein a claim policy can comprise the claim template and health care plan practices and thresholds or values that need to be met to positively identify whether a claim is valid. In some embodiments, claim submissions can be encoded as claim "records", which can further comprise the completed submission and the supporting records from an electronic health record system. In further embodiments, claim policies, and substantiating health care plans, can be encoded as "documents" in the methods and systems described herein. In application, the "documents" can be provided by health care providers or systems, be part of a standardized third party provided electronic health record system, or be developed by a claims processing agency using clinical practice guidelines.

In some embodiments, a method and system is provided for enabling semantic interoperability across different proprietary electronic records. In some embodiments, the method can comprise receiving the document of one or more electronic data systems (or data systems) and reviewing a list or database of the proprietary terms used in any given electronic data system, which can be stored in a proprietary "Data Terminology" list for that electronic data system. In some embodiments, the electronic system can comprise an electronic medical record enterprise system used by a health region, health system or hospital. For the purposes of this application, an electronic data system can comprise an Electronic Medical Records ("EMR") system, or an Electronic Health Records ("EHR") system, or a Computerized Provider Order Entry ("CPOE") system, or a Clinical Documentation system, or any other functionally equivalent system as well known to those skilled in the art. The proprietary data terminology can comprise of an order catalogue, a dictionary of questions and answers, a managed list of terms or phrases, a master services catalogue, dictionaries, controlled vocabularies, while the documents can comprise clinical content types well known to those skilled in the art, such as order sets, clinical documentation templates, care pathways, care maps, evidence-based guidelines, clinical practice guidelines, which can be comprised of data values and associated "terms" drawn from standardized or controlled vocabularies used in the health system. A patient health record can comprise a collection of one or more individual records or transactions that reference a specific patient. Each transaction can comprise at least one data value that has been specified in the context of the clinical content from which it was derived or specified, and terms drawn from the proprietary data terminology. By mapping the data values for order items, documentation items, or results items, in the context of their usage in the clinical content Document, to a universal semantic terminology such as, in some embodiments, SNOMED CT® (Systematized Nomenclature of Medicine Clinical Terms) as developed by The International Health Terminology Standards Development Organisation (http://www.ihtsdo.org) or functionally equivalent semantic terminologies potentially as part of an ontology as well known to those skilled in the art, one can create a patient health record that is semantically coded in the proper context of the clinical content. As an example, it is possible to properly semantically interpret and code the application of multi-use pharmaceuticals, proper clinical context for billing codes, and so on. Other industry standard single-hierarchy terminologies with implied semantics or multi-paradigm, multi-hierarchy semantic terminologies can include LOINC® (Logical Observation Identifiers Names and Codes) as developed by the Regenstrief Institute, Inc. (http://loinc.orq), ICD-9™ or ICD-10™ (International Classification of Diseases) as developed by the World Health Organization ("WHO") (http://www.who.int/classifications/icd/ed/), or UMLS® (Unified Medical Language System) (http://nlm.nih.qov/research/umls/) including RxNorm as developed by the U.S. National Library of Medicine. Those skilled in the art will recognize there are many standards adopted and developing in healthcare. Across different health systems, which can use different order catalogues and controlled vocabularies if not completely different electronic systems, the above process can be repeated. The coded patient records from all the health systems can then be indexed by, among other things, semantic code, hence achieving interoperability, semantically speaking, across different electronic data systems. It is obvious to those skilled in the art that in some embodiments, other standard, non-hierarchical terminology can be used in place of hierarchical semantic terminologies.

Figure 2:
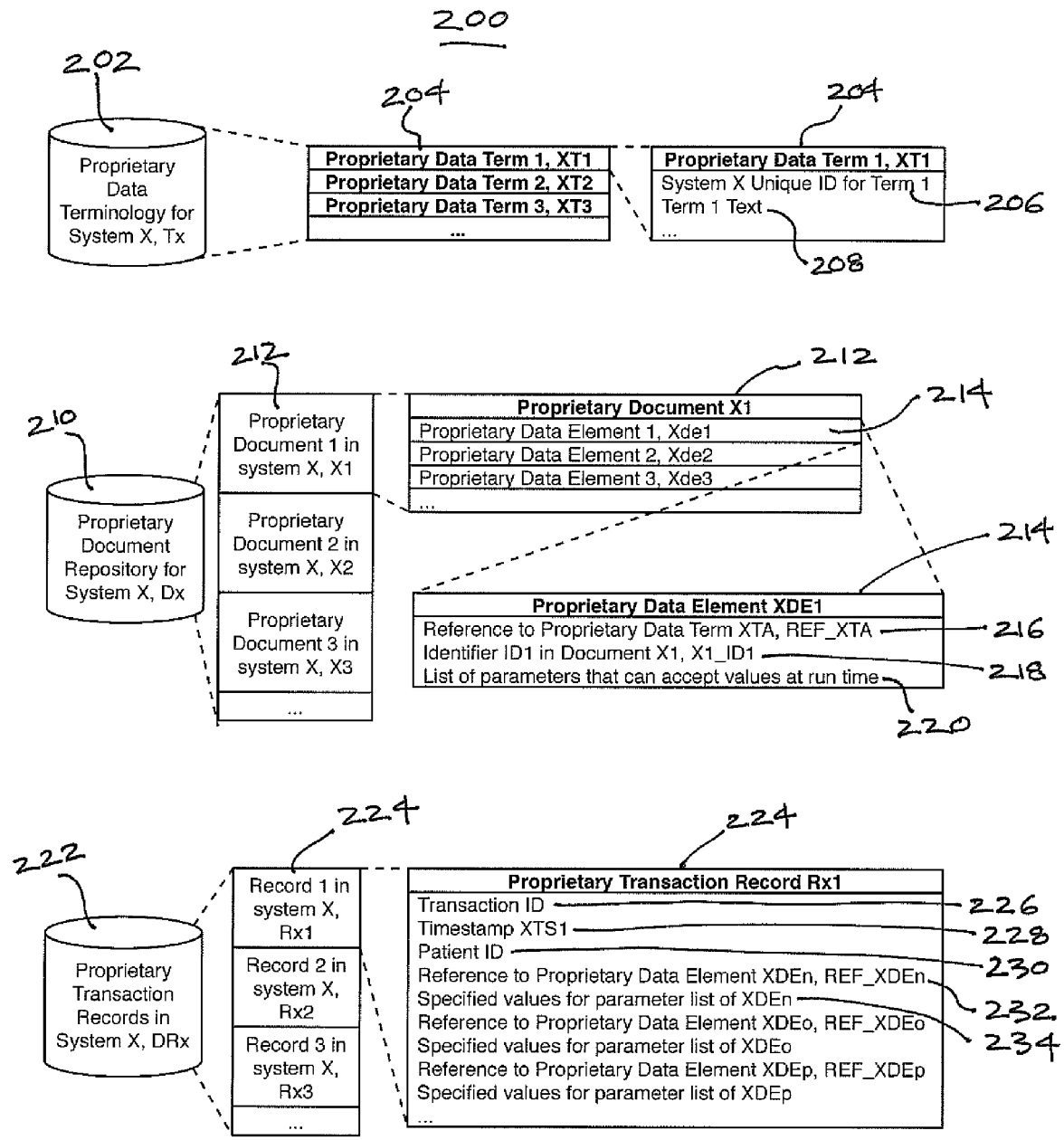
FIG. 2 is a block diagram depicting elements of a proprietary data system.

Referring to FIG. 2, a proprietary data system "X" is illustrated as proprietary data system 200. Data system 200, in some embodiments, can comprise proprietary data terminology list 202, herein referred to as "Tx". Terminology list 202 can further comprise one or more proprietary data terms 204, herein referenced as "XTn", where {n=1,2,3, . . . }. Each data term 204 can further comprise unique numeric code or ID 206, and text 208 that represents the actual text of data term 204 and potentially other fields. In some embodiments, data system 200 can further comprise proprietary document repository 210, herein referred to as "Dx". Document repository 210 can further comprise one or more proprietary documents 212, herein referenced as "Xn", where {n=1,2,3, . . . }. Each document 212 can further comprise one or more proprietary data elements 214, herein referenced as "Xden", where {n=1,2,3, . . . }. Each data element 214 can further comprises one or more references to proprietary data terms 216, unique ID 218 and a list of parameters 220 that can accept values when system 200 is running, and other fields system X may implement. In some embodiments, data system 200 can further comprise proprietary transaction records list 222, herein referred to as "DRx". Records list 222 can further comprise one or more electronic records 224, herein referenced as "Rxn", where {n=1,2,3, . . . }. Each record 224 can further comprise one or more of transaction ID 226, timestamp 228, patient identification 230, references 232 to one or more proprietary data element 214 and specified values 234 for each data element 214 as well as other fields system X may implement. It is obvious to those skilled in the art that system X, as presented herein, is a generic model of an electronic data system, included only as a reference.

Figure 3:
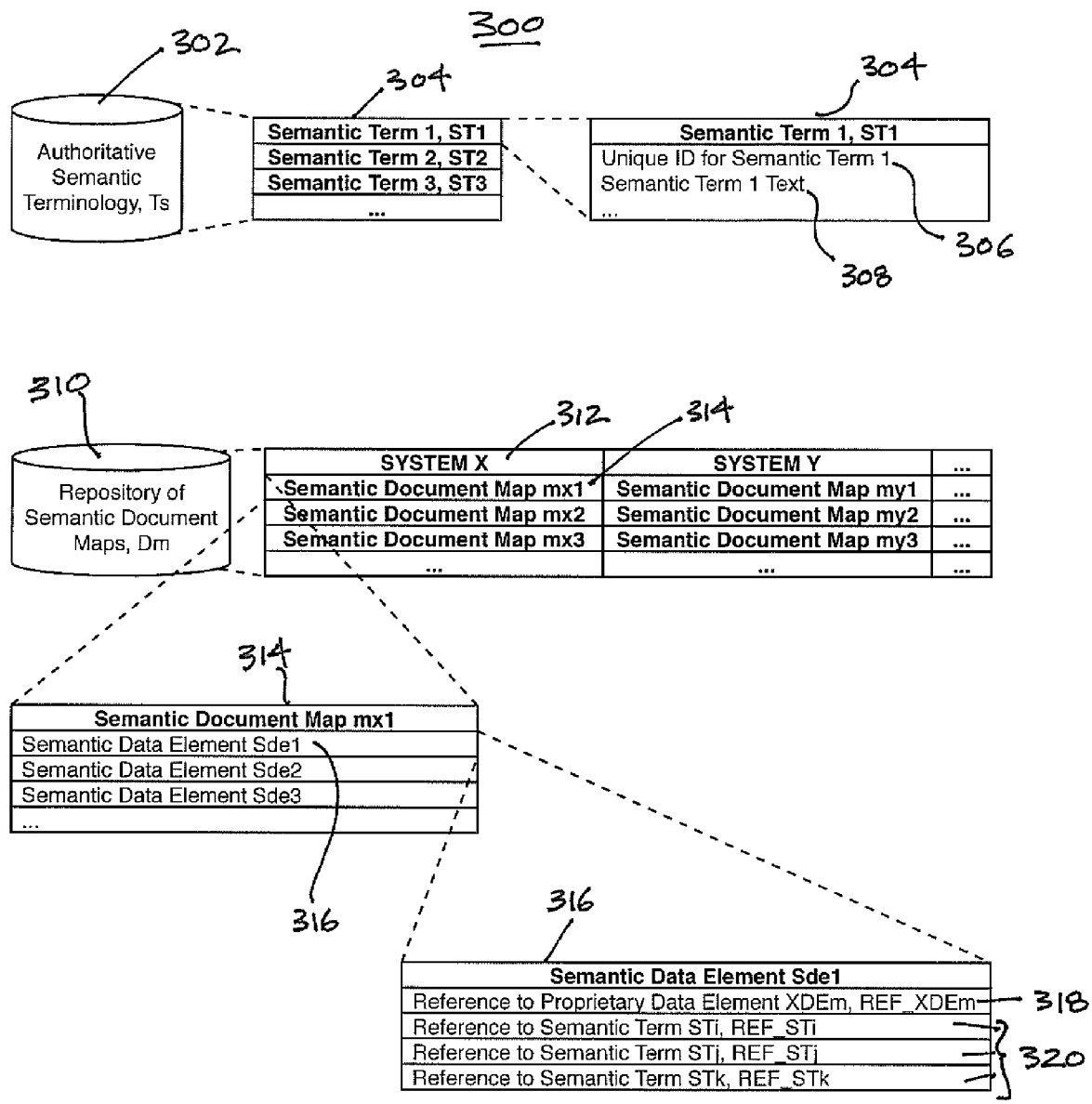
FIG. 3 is a block diagram depicting elements of a semantic data system.

Referring to FIG. 3, a semantic data system "Z" is illustrated as semantic data system 300. In some embodiments, semantic data system 300 can comprise authoritative semantic terminology list 302, herein referred to as "Ts". Semantic terminology list 302 can further comprise one or more semantic terms 304, herein referred to as "STn", where {n=1,2,3, . . . }. Each semantic term 304 can further comprise unique numeric code or ID 306, and text 308 that represents the actual text of semantic term 304 and potentially other fields. In some embodiments, semantic data system 300 can further comprise semantic document map repository 310, herein referred to as "Dm". Repository 310 can comprise one or more semantic document maps 314, herein referred to as "mxn", where {n=1,2,3, . . . }, for each proprietary data system 200. While FIG. 3 illustrates two systems 200 ("X" and "Y"), it is obvious to those skilled in the art that the methods and systems disclosed herein can be used with any number of proprietary data systems 200. Each semantic document map 314 can further comprise one or more semantic data elements 316, herein referred to as "Sden", where {n=1, 2,3, . . . }. Each semantic data element 316 can further comprise reference 318 to a proprietary data element 214 and one or more references to semantic terms 320 and potentially other information.

Figure 4:
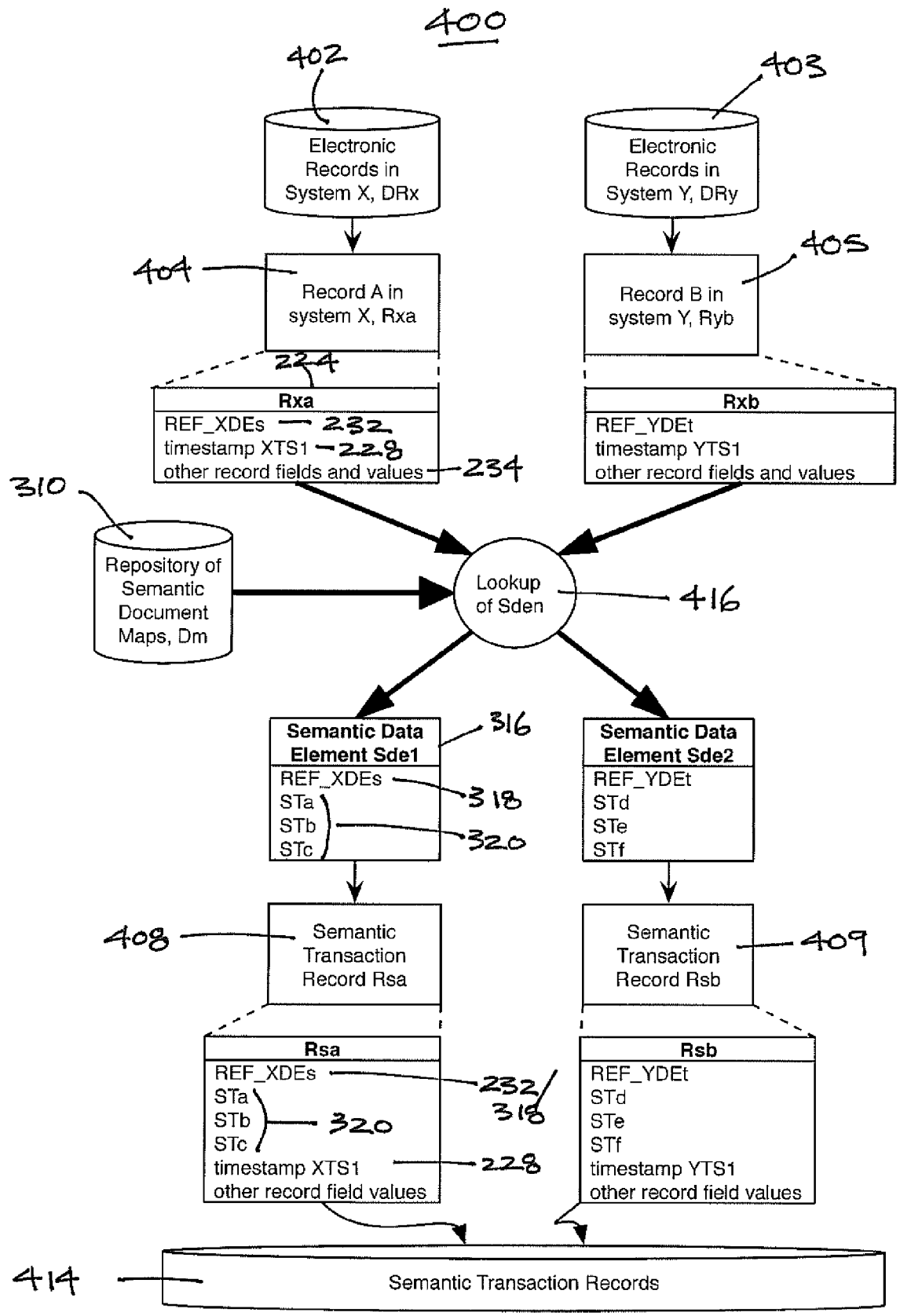
FIG. 4 is a block diagram depicting a system for transforming electronic records in a proprietary electronic data system to semantically structured and coded electronic records.

Referring to FIG. 4, system 400 for transforming electronic records in a proprietary electronic data system to semantically structured and coded electronic records, in some embodiments, is illustrated. While system 400 illustrates two electronic records systems, systems "X" and "Y", it is obvious to those skilled in the art that the methods and systems disclosed herein can be used with any number of electronic records systems.

In some embodiments, system 400 can comprise electronic records 402, herein referenced as "DRx" for system "X", and can further comprise electronic records 403, herein referenced as "DRy" for system "Y". Records 402 and 403 can each comprise of one or more records 404 and 405, respectively, herein referred to as "Rxa" and "Ryb". Each of records 404 and 405 can each comprise a proprietary transaction record 224. In some embodiments, for each proprietary transaction record 404, system 400 can look up, from semantic document map repository 310, semantic data element 316 where reference 318 and reference 232 point to the same proprietary data element XDEs. It is obvious to those skilled in the art that the semantic data elements can be indexed by the reference to proprietary data element, REF_XDEs 318, for rapid lookup. Next, semantic data elements 316 can be used to derive new semantic transaction record 408, herein referred to as "Rsa", by combining record field values of the proprietary transaction record 404 with the references to semantic terms 320. Each semantic transaction record 408 can further comprise reference 232 (same as 318) to a proprietary data element 214, references to semantic terms 320, timestamp 228 and other record field values. It is obvious to those skilled in the art that a similar lookup of the semantic data element, association of semantic terms into a new semantic transaction record 409 can occur for proprietary transaction record 405. In further embodiments, semantic transaction records 408 and 409 can be stored and indexed in repository of semantic transaction records 414, wherein the semantic transaction records can be semantically queried or analyzed.

As an example, consider two hospital systems, "Hospital A" and "Hospital B". Hospital A uses EHR software made by vendor X, further comprising an order catalogue listing an order item such as "aspirin tab 325 mg". Physicians at Hospital A give treatments based on order sets, from which they order "order items". One order set might be "common analgesic for mild pain" and include the order item "aspirin tab 325 mg", while a different order set might be "Congestive Heart Failure" and also include the order item "aspirin tab 325 mg" but used as an anti-platelet. In these cases, aspirin tab 325 mg is a common term but is prescribed in very different contexts, that is, used to treat two different ailments. As part of the semantic data element, the semantic code for the suspected ailment can be identified, not just the semantic code for the product. In structured clinical documentation, the coding may depend on the context and combination of documented values about the patient. As an example, "blood pressure normal" may be a conclusion that varies on patient gender, body mass, and/or age. As a further example, terms that represent proprietary assessment models such as "level of care" or "resuscitation level" can be specified and interpreted in many unique and different ways. The proper semantics intended in this context is captured in the semantic document map.

Meanwhile, Hospital B uses a completely different EHR software system from vendor Y, comprising its own order catalogue, different than Hospital A's catalogue. In the Hospital B catalogue, there is an item called "acetylsalicylic acid tab 325 mg". Similar to Hospital A, Hospital B will have an order set called "mild head pain", and another called "STEMI anti-platelets", both containing the order item "acetylsalicylic acid tab 325 mg". Both the order catalogue item and the treatments are the same for the two hospitals but each hospital has different terms for the item and the treatment.

Lets say a patient goes to the hospital, in Hospital A or in Hospital B, and a physician prescribes the patient 325 mg of aspirin. The patient will have an entry created in his or her patient record. The key thing to note is that the patient record will show two things: 1) the patient received 325 mg of aspirin, and 2) the context in which the aspirin was given, that is, from which order set was the aspirin ordered.

In some embodiments, once the patient record is entered in the index of the methods and systems disclosed herein, the following questions can be asked and answered through queries of the index:

How many people in a given region were given an aspirin product, for any reason?

How many people in a given region were given aspirin for coronary syndromes?

How many people in a given region were given an analgesic of any kind (including aspirin) for the treatment of pain?

In some embodiments, a method and system is provided wherein a single standard 'Semantic Terminology' can be adopted. This means that there can be a single standard catalogue to which all hospitals in a given region can map their catalogue items. This can overcome the confusion issue that can arise where Hospital A uses "aspirin tab 325 mg", and where Hospital B uses "acetylsalicylic acid tab 325 mg", yet both hospitals are talking about the same conceptual order. Furthermore, the "Semantic Terminology" can comprise a structure that can explain relationships between catalogue items based on a hierarchical semantic structure. For example, a user would know that: "aspirin tab 325 mg" is an "aspirin product", which is a "non-opioid analgesic product", which is an "analgesic product", which is further a "pharmaceutical product". Furthermore, in some embodiments, additional semantic terms can be associated for qualifying a context such as stage of care process, care workflow, (e.g. assessment, pre-operative, recovery) or other factors not directly related in the semantic terminology.

In some embodiments, a method and system is provided wherein order catalogue items can be mapped to the "Semantic Terminology" in a way that depends on the context in which they are used. This means that rather than naively mapping the catalogues of Hospitals A and B directly to the "Semantic Terminology", the catalogue items can be mapped within the context of an order set. This is possible because the "Semantic Terminology" can be configured such that there is an entry, or a combination of entries, that can distinguish between "aspirin tab 325 mg used to treat pain" and "acetylsalicylic acid 325 mg used to treat for coronary syndromes". It is obvious to those skilled in the art that other embodiments can use the same principle for other forms of clinical content beyond order sets and order items, including but not limited to clinical documentation templates, structured documentation, care maps, care pathways, clinical assessments, and controlled documentation fields and values.

In some embodiments, a method and system is provided wherein all patient record entries can be taken from both Hospitals A and B, as an example, and map each record entry to an item in the "Semantic Terminology", and then enter the entries into an index that can allow the questions listed above to be asked and answered.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A system for semantically coding at least one proprietary document belonging to at least one proprietary data system, the system comprising:

a) at least one proprietary data terminology list associated with at least one proprietary data system, wherein each proprietary data terminology list comprises at least one proprietary data term;
   b) a proprietary document repository associated with the at least one proprietary data system, the proprietary document repository comprising at least one proprietary document associated with the at least one proprietary data system, each proprietary document further comprising at least one proprietary data element;
   c) at least one proprietary transaction record associated with the at least one proprietary data system, each proprietary transaction record comprising a timestamp and a reference to the at least one proprietary data element; and
   d) one or more semantic data system, wherein each semantic data system further comprises:
      i. an authoritative or universal semantic terminology comprising at least one semantic term;
      ii. means for receiving the proprietary data terminology associated with the at least one proprietary data system;
      iii. means for receiving the at least one proprietary document associated with the at least one proprietary data system; and
      iv. means for creating at least one semantic document map, wherein the at least one semantic document map comprises at least one semantic data element, and wherein each semantic data element comprises the reference to the at least one proprietary data element and at least one of the at least one semantic terms.

2. The system as set forth in claim 1, wherein each of the at least one proprietary data terms comprises a first identifier and text associated thereto.

3. The system as set forth in claim 1, wherein each of the at least one proprietary data elements further comprises a second identifier and at least one of the at least one proprietary data terms.

4. The system as set forth in claim 1 wherein, in the event that the at least one proprietary document already pre-exists, the means for creating the semantic document map comprises:

a) means for assembling the at least one semantic data element for each of the at least one proprietary data term associated with one of the at least one proprietary document; and
   b) means for adding the at least one semantic term to the at least one semantic data element.

5. The system as set forth in claim 1 wherein, in the event that the at least one proprietary document does not already pre-exist, means for creating the semantic document map comprises:

a) means for assembling the at least one semantic data element for each of the at least one proprietary data element using at least one of the at least proprietary data term;
   b) means for adding the at least one semantic term to the at least one semantic data element; and
   c) means for generating the at least one proprietary document using the at least one proprietary data element.

6. A method for semantically coding at least one proprietary document belonging to at least one proprietary data system, the method comprising the steps of:

a) providing at least one proprietary data terminology list associated with at least one proprietary data system, wherein each proprietary data terminology list comprises at least one proprietary data term;

b) providing a proprietary document repository associated with the at least one proprietary data system, wherein the proprietary document repository comprises at least one proprietary document associated with the at least one proprietary data system, and wherein each proprietary document further comprises at least one proprietary data element;

c) providing, via a data system, at least one proprietary transaction record associated with the at least one proprietary data system, wherein each proprietary transaction record comprises a timestamp and a reference to the at least one proprietary data element;

d) providing an authoritative or universal semantic terminology, wherein the authorative or universal semantic terminology comprises at least one semantic term;

e) receiving the proprietary data terminology associated with the at least one proprietary data system;

f) receiving the at least one proprietary document associated with the at least one proprietary data system; and g) creating at least one semantic document map, wherein the at least one semantic document map comprises at least one semantic data element, and wherein each semantic data element comprises the reference to the at least one proprietary data element and at least one of the at least one semantic terms.

7. The method as set forth in claim 6, wherein each of the at least one proprietary data terms comprises a first identifier and text associated thereto.

8. The method as set forth in claim 6, wherein each of the at least one proprietary data elements further comprises a second identifier and at least one of the at least one proprietary data terms.

9. The method as set forth in claim 6 wherein, in the event that the at least one proprietary document already pre-exists, the method further comprises the steps of:

a) assembling the at least one semantic data element for each of the at least one proprietary data element associated with one of the at least one proprietary document; and b) adding the at least one semantic term to the at least one semantic data element.

10. The method as set forth in claim 6 wherein, in the event that the at least one proprietary document does not already pre-exist, the method further comprises the steps of:

a) assembling the at least one semantic data element for each of the at least one proprietary data element using at least one of the at least one proprietary data term;

b) adding the at least one semantic term to the at least one semantic data element; and c) generating the at least one proprietary document using the at least one proprietary data element.

11. A non-transitory computer readable medium having instructions stored thereon for semantically coding at least one proprietary transaction data record belonging to at least one proprietary data system, such that when the instructions are executed by a processor cause the processor to:

a) receive the at least one proprietary transaction data record from the at least one proprietary data system;

b) derive at least one proprietary data element and at least one proprietary document associated with the at least one proprietary transaction data record;

c) look up a semantic map corresponding to the at least one proprietary data element and to the at least one proprietary document, and determine at least one semantic term; and d) associate the at least one proprietary transaction data record with the at least one semantic term to create a semantic transaction record wherein the created semantic transaction record comprises a reference to the at least one proprietary transaction data record and the at least one semantic term.

12. A system for semantically coding at least one proprietary transaction data record belonging to at least one proprietary data system, the system comprising:

a) means for receiving the at least one proprietary transaction data record from the at least one proprietary data system;

b) means for deriving at least one proprietary data element and at least one proprietary document associated with the at least one proprietary transaction data record;

c) means for looking up a semantic map corresponding to the at least one proprietary data element and to the at least one proprietary document, and determining at least one semantic term; and d) means for associating the at least one proprietary transaction data record with the at least one semantic term to create a semantic transaction record, wherein the created semantic transaction record comprises a reference to the at least one proprietary transaction data record and the at least one semantic term.

* * * * *

UNITED STATES PATENT AND TRADEMARK OFFICE
CERTIFICATE OF CORRECTION

PATENT NO. : 8,666,785 B2
APPLICATION NO. : 13/193280
DATED : March 4, 2014
INVENTOR(S) : Baluta et al.

It is certified that error appears in the above-identified patent and that said Letters Patent is hereby corrected as shown below:

In the Specification
Column 6, lines 60-61, change "e-filed. sub-missions" to --e-filed sub-missions--;
Column 7, line 39, change "carded" to --carried--;
Column 8, line 47, change "http://loinc.orq" to --http://loinc.org--;
Column 8, line 51, change "http://nlm.nih.qov/research/umls/" to
--http://nlm.nih.gov/research/umls/--;

In the Claim
Claim 5, column 12, line 51, change "pre-exist, means" to --pre-exist, the means--; and
Claim 11, column 14, line 21, change "record wherein" to --record, wherein--.

Signed and Sealed this
Twenty-seventh Day of May, 2014

Michelle K. Lee
*Deputy Director of the United States Patent and Trademark Office*